United States Patent [19]

Ziegenfus

[11] 4,338,864
[45] Jul. 13, 1982

[54] ASSEMBLY LINE DRIVERLESS VEHICLE

[75] Inventor: Barry L. Ziegenfus, Saylorsburg, Pa.

[73] Assignee: SI Handling Systems, Inc., Easton, Pa.

[21] Appl. No.: 138,379

[22] Filed: Apr. 8, 1980

[51] Int. Cl.³ .................... B61B 13/04; B61B 13/12
[52] U.S. Cl. .................................. 104/121; 104/166;
  105/147; 198/472; 211/122; 248/647; 269/56
[58] Field of Search .................. 104/118–121,
  104/165, 166; 105/141, 144–147; 269/56;
  248/298, 647; 211/122; 414/607, 785; 198/473, 472

[56] References Cited

U.S. PATENT DOCUMENTS

| | | | |
|---|---|---|---|
| 1,534,018 | 4/1925 | Ames | 105/147 X |
| 1,699,544 | 1/1929 | Rohlfing | 105/147 X |
| 2,971,475 | 2/1961 | Weber | 104/119 X |
| 3,308,921 | 3/1967 | Bower | 198/345 |
| 3,356,040 | 12/1967 | Fonden | 104/166 X |
| 3,662,691 | 5/1972 | Goirand | 104/166 X |
| 3,817,184 | 6/1974 | Stafford et al. | 104/131 |
| 3,818,837 | 6/1974 | Jacoby et al. | 104/166 |
| 3,858,626 | 1/1975 | Ribordy | 104/166 |
| 3,903,810 | 9/1975 | Jones | 104/166 |
| 3,966,069 | 6/1976 | Fathauer | 414/607 |
| 4,036,148 | 7/1977 | Jones et al. | 104/166 |
| 4,065,007 | 12/1977 | Kurahashi | 104/166 X |
| 4,074,632 | 2/1978 | Kurahashi et al. | 104/166 X |
| 4,194,864 | 3/1980 | Yamauchi et al. | 414/785 X |

FOREIGN PATENT DOCUMENTS 754911 8/1956 United Kingdom ............... 198/472

Primary Examiner—Randolph A. Reese
Attorney, Agent, or Firm—Seidel, Gonda, Goldhammer & Panitch

[57] ABSTRACT

A monorail driverless vehicle for use on an assembly line includes a vertically disposed frame having a drive wheel on the upper end of the frame and biased downwardly for contact with a drive shaft. Aligned support wheels on the frame are adapted for contact with a track therebelow. A fixture may be mounted on either side face of the vehicle for removably supporting the workpiece to be worked on by persons or apparatus along the assembly line.

9 Claims, 4 Drawing Figures

ASSEMBLY LINE DRIVERLESS VEHICLE

BACKGROUND

Monorail vehicles, per se, are old in the art. For example, see U.S. Pat. Nos. 4,065,007 and 4,074,632. A vehicle having a vertically disposed rack is shown in FIG. 4 of U.S. Pat. No. 3,817,184. Horizontally disposed vehicles which ride on tracks about three feet above the floor are known. The provision of an actuator for controlling the vehicle drive wheel between drive and stop positions is per se old as per U.S. Pat. Nos. 3,818,837; 3,356,040; 3,903,810; 3,858,626.

The present invention is directed to solution of the problem of constructing such a driverless vehicle so as to be adapted for supporting vertically disposed work pieces along an assembly line with minimum height off the floor and minimun width transverse to the direction of movement.

SUMMARY OF THE INVENTION

The present is directed to a driverless vehicle for supporting a work piece and guided for movement along a path such as an assembly line. The vehicle includes a vertically disposed frame. A drive wheel is supported by the upper end of the frame and biased upwardly for contact with the drive shaft. An actuator is provided on the frame and coupled to the drive wheel for rotating the drive wheel between a drive position and a stop position.

The frame is provided with aligned support wheels on the lower end of the frame for riding on a track therebelow. Guide means are provided on the frame for rolling contact with a guide generally parallel to the track. A fixture is provided on a side face of the frame for removably supporting a workpiece in an upright position.

It is an object of the present invention to provide a novel assembly line type driverless vehicle.

It is another object of the present invention to provide a driverless vehicle having a drive wheel at the upper end thereof and having a fixture on a side face of the vehicle for supporting a workpiece in an upright position.

It is another object of the present invention to provide a novel driverless vehicle which is bottom supported and top guided with a top propulsion means while being capable of supporting a workpiece on either one of its opposite major side faces.

Other objects will appear hereinafter.

For the purpose of illustrating the invention, there is shown in the drawing a form which is presently preferred; it being understood, however, that this invention is not limited to the precise arrangements and instrumentalities shown.

DETAILED DESCRIPTION

Figure 1:
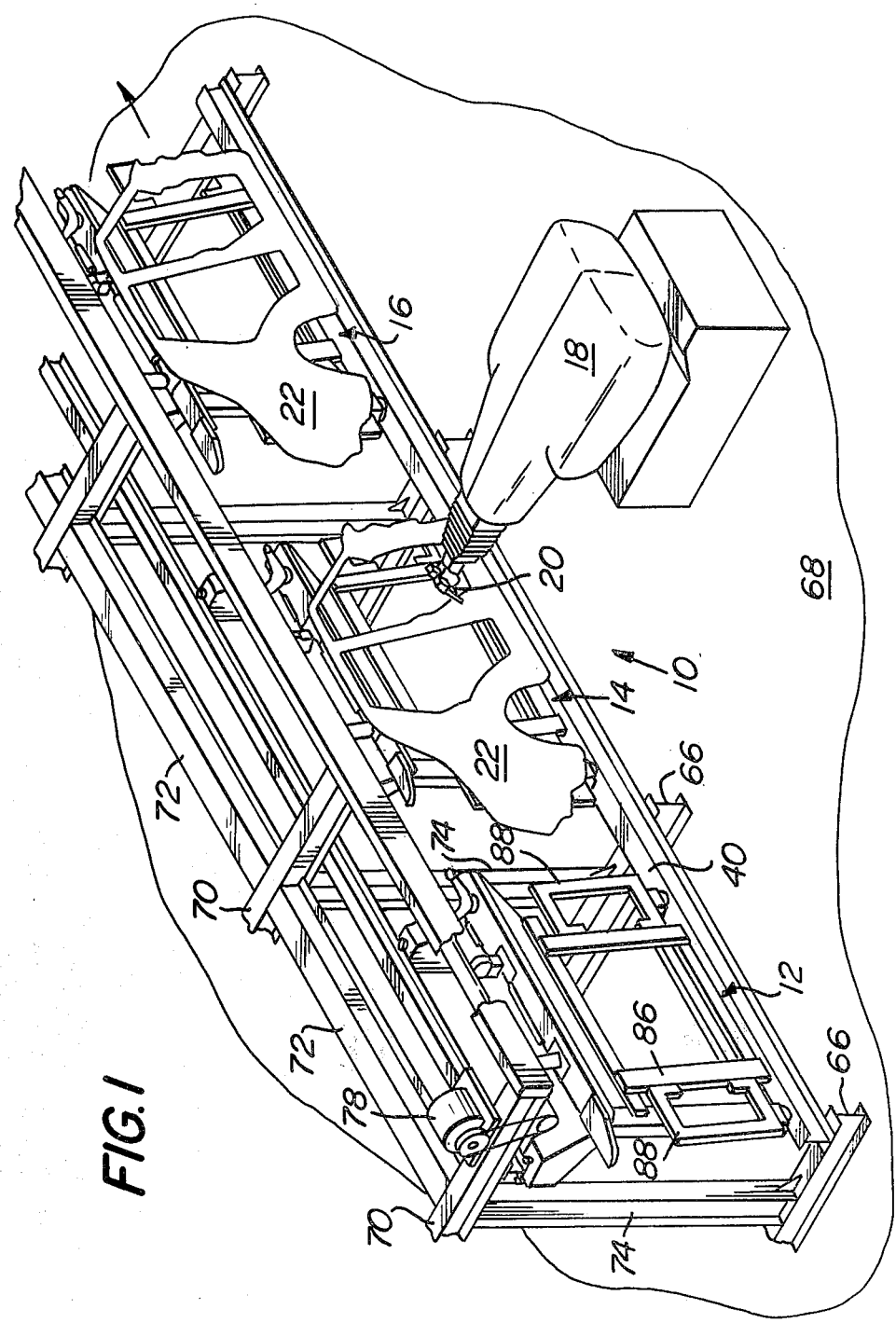
FIG. 1 is a partial perspective view of an assembly line incorporating the vehicle of the present invention.

In FIG. 1 there is illustrated a portion of an assembly line designated generally as 10. The assembly line includes a plurality of discrete vehicles which are independent from one another and designated 12, 14 and 16.

The vehicles 12, 14 and 16 are caused to intermittently stop at various stations along the assembly line. For purposes of illustration, at one of the stations there is provided a machine such as welder 18 having a welding head 20 which may move toward and away from a workpiece 22 supported by one of the vehicles. At the work stations, the vehicles are caused to slow down or stop so that work may be performed on the workpieces 22. The work performed on the workpieces may assume a wide variety such as welding, painting, inspection, riveting, grinding, etc.

Figure 2:
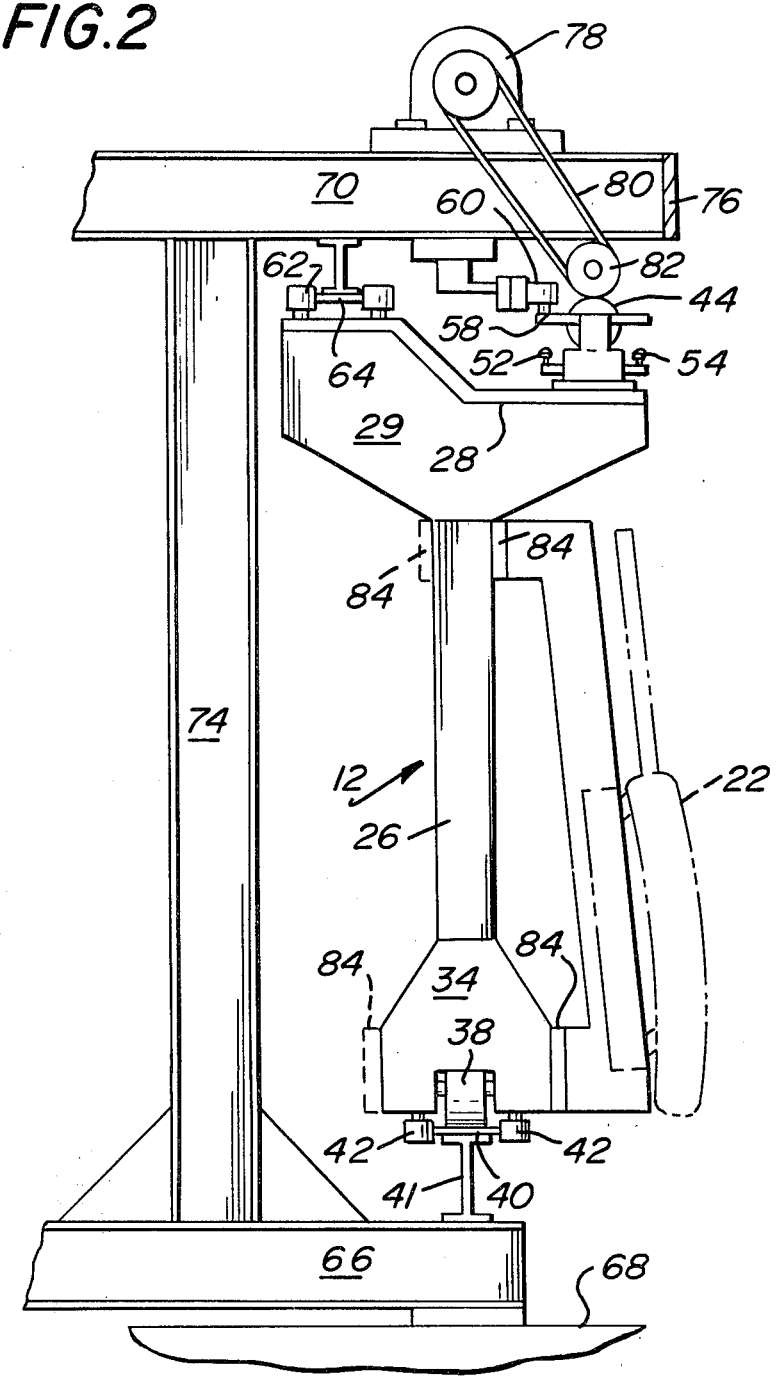
FIG. 2 is an end view at the lefthand end of FIG. 1.
Figure 3:
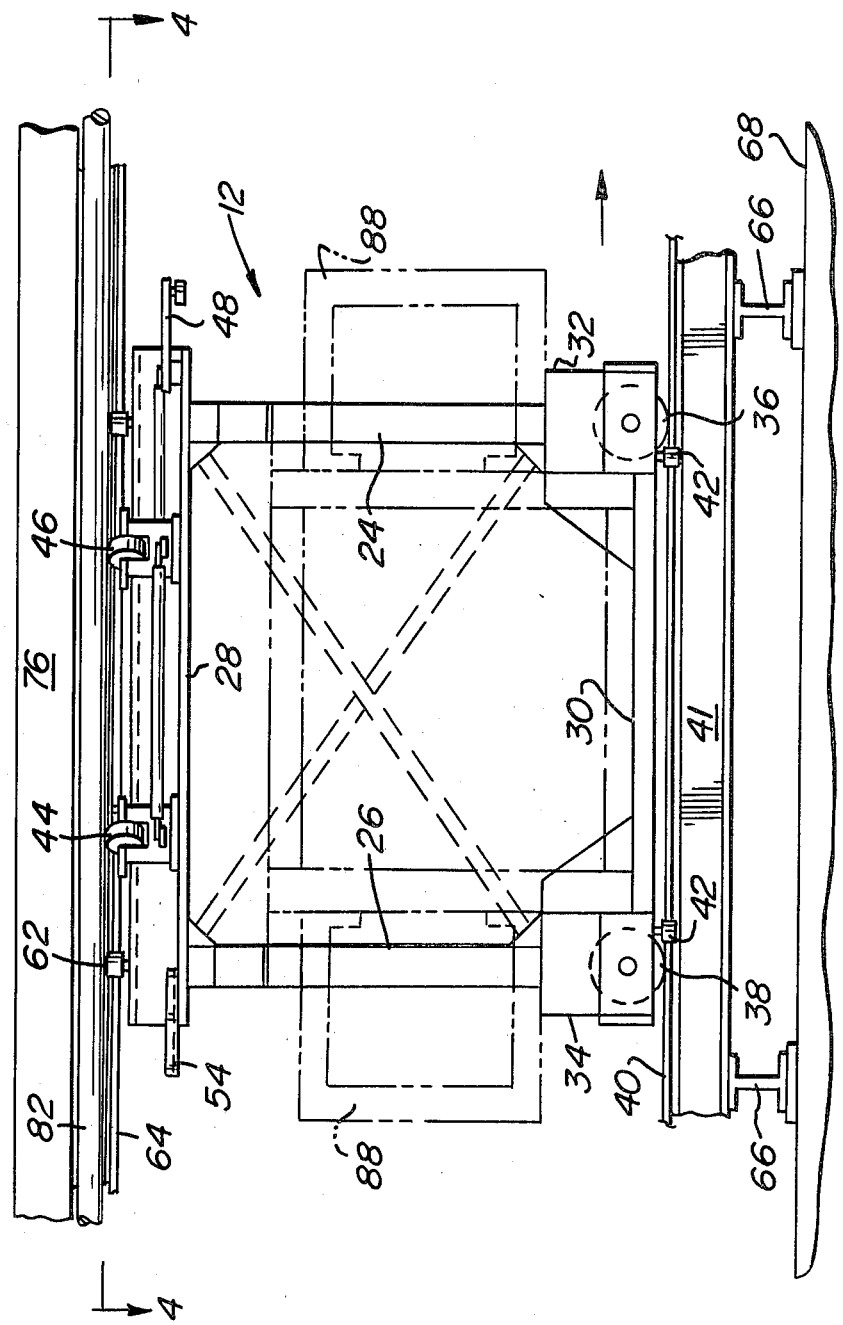
FIG. 3 is a side elevation view of a vehicle in accordance with the present invention.

The vehicles are identical. Hence, only vehicle 12 will be described in detail. Referring to FIGS. 2 and 3, the vehicle 12 includes an upright narrow frame which includes vertically disposed front and rear members 24, 26 respectively interconnected at their upper ends by a top member 28 and interconnected at their lower ends by a bottom member 30. The bottom member 30 is enlarged at its ends 32, 34 for rotatably supporting a pair of aligned wheels 36, 38 respectively. The wheels 36, 38 support the frame of vehicle 12 on a monorail track 40 supported by a I-shaped beam 41. Each end of the bottom member 30 has a pair of guide rollers 42 in rolling contact with a side face of the track 40.

Figure 4:
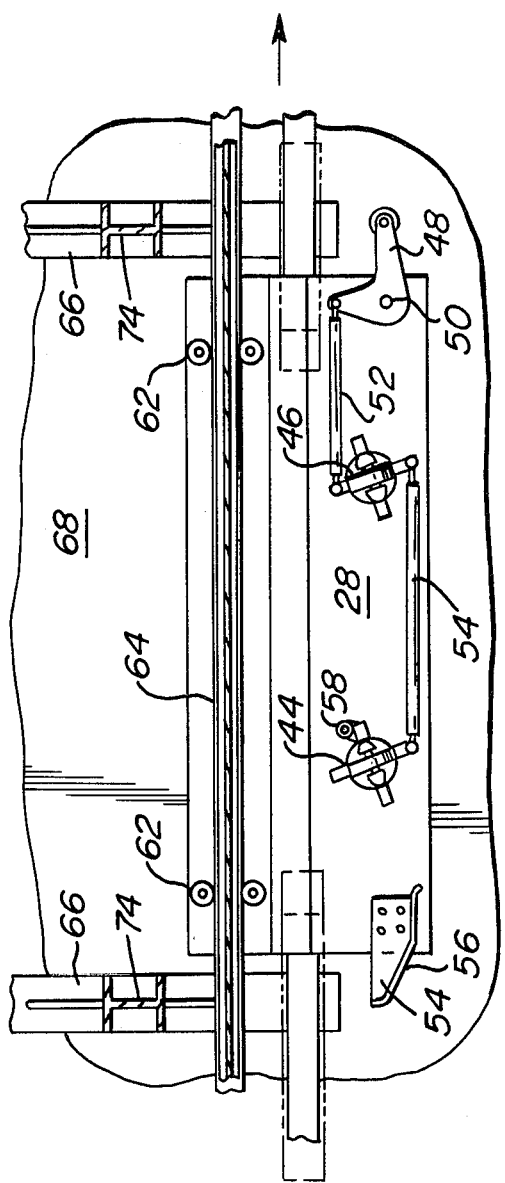
FIG. 4 is a sectional view taken along the line 4—4 in FIG. 3.

As shown more clearly in FIG. 2, the top member 28 is wider than the bottom member 30. The top member 28, intermediate its ends, supports a drive wheel for propelling the vehicle 12 along the track 40. As illustrated in FIGS. 3 and 4, the vehicle 12 is provided with a pair of drive wheels 44, 46. A pair of drive wheels are utilized for heavy frames requiring a substantial driving force.

The support for the drive wheels 44, 46 is (a) spring biased upwardly by a coil spring, (b) mounted for oscillation about a vertical axis through an arc of about 45° for movement between a drive position and a stop position, (c) and is spring biased to the drive position preferably by a torsion spring. A first actuator for oscillating the drive wheels 44, 46 is an accumulation member 48 having a contact roller at a free end thereof and mounted for oscillation about a vertical axis corresponding to pin 50. Member 48 is connected to a support for the drive wheel 46 by way of link 52. The support for drive wheel 46 is interconnected with the support for drive wheel 44 by way of link 54. See FIG. 4. An accumulation tail member 54 is provided adjacent the rear end of the top member 28 and has a cam surface 56 for cooperation with a member 48 on the next adjacent vehicle. Member 48 on one vehicle and member 54 on the next adjacent vehicle cooperate to prevent the vehicles from colliding with one another since the cam surface 56 will oscillate member 48 sufficiently to move the drive wheels from a drive position to a stop position. This feature is described in greater detail in U.S. Pat. No. 3,818,837.

In order to cause the frame 12 to stop or slow down at preselected stations along the assembly 10, one of the drive wheels such as drive wheel 44 is provided with a roller 58 on its support. Roller 58 is at an elevation so that it may selectively contact a limit stop 60 and cause the drive wheels to oscillate against the bias of the torsion spring. Limit stop 60 is selectively moveable so as to permit the vehicle 12 to move non-stop past the station or to cause the vehicle to slow down and then accelerate, or to cause the vehicle to stop at any desired station. The limit stop 60 may be hydraulically, pneumatically, or solenoid operated between its operative and inoperative positions. The actuator for the limit stop 60 is preferably interrelated with circuitry associated with the machine 18 or is controlled by an operator so that the vehicle may be released for movement to the next operating station as soon as operation on the workpiece 22 has terminated.

In the preferred embodiment, the top member 28 is a plate having lower and upper elevations supported at its ends by plate 29. The lower elevation supports the drive wheels 44, 46. At the upper elevation, there is provided a pair of guide rollers 62 which cooperate with a stationary guide 64. Guide 64 is parallel to the track 40.

Referring to FIG. 2, it will be noted that the center of guide 64 is spaced from the vertical center line of the vehicle 12 by an amount corresponding approximately to the amount of the spacing between said vertical center line and the center of the drive wheels 44, 46. Thus, the guide rollers 62 are on one side of the vertical center line of the vehicle 12 while the drive wheels are on the opposite side.

The beam 41 may be supported at spaced points therealong by transverse beams 66 mounted on the floor 68. Beams 70 are disposed above the beams 66. The beams 70 are interconnected in a longitudinal direction by beams 72 and are supported from the beams 66 by beams 74. The ends of the beams 70 are interconnected by a plate 76.

Motors 78 are supported by the beams 70 at spaced points along the assembly line. Only one such motor 78 is shown in FIGS. 1 and 2. The motor 78 is coupled by way of a belt 80 to a drive shaft 82. Drive shaft 82 is parallel to the track 40. The drive wheels 44, 46 are spring biased upwardly into contact with the drive shaft 82. See FIGS. 2 and 3.

Referring to FIG. 2, on opposite side faces of the frame 12 adjacent the upper and lower ends thereof, there are provided mounting plates 84 for removably supporting a fixture 86. Fixture 86 may be removably attached to either side of the vehicle 12. Fixture 86 may be provided with removable extensions 88 where the nature of the workpiece 22 requires the same. For example, such extensions would be required where the workpiece 22 is a side frame of an automobile. The extensions 88 are removable and shown in phantom in FIG. 3. The workpiece 22 is mounted on the fixture 86 in any conventional manner so as to facilitate rapid attachment and removal of the workpiece 22.

The driverless vehicle of the present invention structurally interrelated as set forth above and illustrated in the drawings has a number of advantages. There is excellent access to the workpiece with ample work space for personnel. The vehicles are of the accumulating type whereby vehicle 12 may contact and accumulate adjacent vehicle 14 while the workpiece 22 on vehicle 14 is being worked on. This minimizes the time necessary to position the vehicle 12 in position for the machine 18 to work on the next work piece.

All power components are located adjacent the upper end of the assembly line and are easily accessible for maintenance from the top of the assembly line frame. The vertical configuration of the vehicles decreases the floor space requirements while lowering the elevation of the assembly line so that workpieces of substantial height may be accomodated. The vehicles are designed for heavy load capacities on either or both sides of the vehicles. That is, a workpiece may be mounted on each side of the vehicle for simultaneous operation on the workpiece by machines or personnel from opposite sides of the workpiece. As illustrated, machine 18 operates on one side of the workpiece 22 while at the same time sufficient open space is provided so that personnel may simultaneously act on the other or inner side of the workpiece 22. If increased rigidity is needed, internal bracing 90 may be provided as shown in phantom in FIG. 3. While the vehicles are preferably used on an assembly line, they can be used for other purposes such as for moving workpieces in a warehouse.

The present invention may be embodied in other specific forms without departing from the spirit or essential attributes thereof and, accordingly, reference should be made to the appended claims, rather than to the foregoing specification, as indicating the scope of the invention.

I claim:

1. A driverless vehicle comprising a vertical frame whose primary function is to support a workpiece as the frame moves along an assembly line, said frame having a height which is greater than its width, at least one drive wheel mounted on the upper end of said frame and biased upwardly for contact with a driveshaft, at least one actuator on the frame and coupled to the drive wheel for oscillating the drive wheel about a vertical axis between drive and stop positions, aligned support wheels on the lower end of said frame for riding on a track, guide means on said frame for rolling contact with a guide generally parallel to the track, and a fixture on a side face of said frame for removably supporting the workpiece in an upright position so that the workpiece may be worked on at stations along an assembly line.

2. A vehicle in accordance with claim 1 wherein said guide means is adjacent the top of the frame and on the opposite side of the center line of the frame from the drive wheel, said support wheels being generally along the center line of the frame, said fixture and drive wheel being on the same side of said center line.

3. A vehicle in accordance with claim 1 including removable extensions on said fixture for projecting forwardly and rearwardly of the frame.

4. A vehicle in accordance with claim 1 including mounting structure on opposite side faces of said frame to facilitate supporting said fixture on opposite side faces of the frame.

5. A vehicle in accordance with claim 1 wherein a pair of actuators are supported on the frame adjacent the drive wheel for oscillating said drive wheel, one of said actuators being adapted to contact a selectively moveable limit stop, the other actuator being aligned with a tail secured to the trailing end of the frame so that the other actuator may cause accumulation of the vehicle by contact with another vehicle, said actuators being at different elevations.

6. Apparatus comprising a monorail, a vehicle for supporting a workpiece to be worked on, said vehicle including a generally narrow upright frame, a drive shaft at an elevation about the elevation of the frame, means supporting said drive shaft for rotation about a horizontal axis, a drive wheel supported by the upper end of the frame and biased upwardly for contact with said drive shaft, an actuator on said frame and coupled to said drive vehicle for oscillating the drive wheel about a vertical axis between drive and stop positions, aligned support wheels on the lower end of the frame for riding on said monorail, and mounting means on opposite side faces of said frame for removably supporting a workpiece in an upright position so that the workpiece may be worked on while the drive wheel is in its stop position.

7. Apparatus in accordance with claim 6 wherein the longitudinal axis of said drive shaft is disposed to one side of a vertical center line on said frame, said frame having guide rollers for cooperating with a stationary guide on the opposite side of said center line from said drive wheel.

8. Apparatus in accordance with claim 6 wherein the frame has a central opening to facilitate access to a workpiece from opposite sides of the frame.

9. Apparatus comprising an assembly line, said assembly line having a track parallel to a guide and a drive shaft, means above the elevation of the track for supporting a driveshaft, a plurality of driverless vehicles, each vehicle comprising a vertical frame having at least one drive wheel mounted on the upper end thereof and biased upwardly into contact with said driveshaft, at least one actuator on each frame and coupled to the associated drive wheel for oscillating its drive wheel about a vertical axis between drive and stop positions, aligned support wheels on the lower end of each frame and riding on said track, guide means on each frame for rolling contact with said guide, and a fixture on a side face of each frame for removably supporting a work piece in an upright position.

* * * * *